United States Patent
Stukenberg et al.

(10) Patent No.: US 10,859,135 B2
(45) Date of Patent: Dec. 8, 2020

(54) COUPLING PIECE ELEMENT FOR A JOINING SHACKLE FOR ANCHOR CHAINS

(71) Applicant: SCHMIEDESTUECK-VERTRIEB FEUERSTEIN GmbH, Hattingen (DE)

(72) Inventors: Till Stukenberg, Bochum (DE); Nina Sverdlova, Castrop Rauxel (DE)

(73) Assignee: SCHMIEDESTUECK-VERTRIEB FEUERSTEIN GMBH

( * ) Notice: Subject to any disclaimer, the term of this patent is extended or adjusted under 35 U.S.C. 154(b) by 0 days.

(21) Appl. No.: 16/092,519

(22) PCT Filed: Apr. 28, 2017

(86) PCT No.: PCT/DE2017/100359
§ 371 (c)(1),
(2) Date: Oct. 10, 2018

(87) PCT Pub. No.: WO2017/186236
PCT Pub. Date: Nov. 2, 2017

(65) Prior Publication Data
US 2019/0162270 A1    May 30, 2019

(30) Foreign Application Priority Data
Apr. 29, 2016 (DE) .......... 10 2016 108 051

(51) Int. Cl.
*F16G 15/04* (2006.01)
*F16G 15/02* (2006.01)

(52) U.S. Cl.
CPC ............. *F16G 15/04* (2013.01); *F16G 15/02* (2013.01)

(58) Field of Classification Search
CPC .......... F16G 15/00; F16G 15/02; F16G 15/04; F16G 15/06; F16G 15/10; F16G 15/12; F16G 15/13; B21L 9/08
(Continued)

(56) References Cited

U.S. PATENT DOCUMENTS 6,216,435 B1 * 4/2001 Bogdan ................. F16G 15/02
                                                                    59/85
8,056,315 B2 * 11/2011 Mulle ..................... F16G 15/02
                                                                    59/85
8,087,227 B2   1/2012 Fuerstein

FOREIGN PATENT DOCUMENTS

DE        3916284 A1     5/1989
DE   102009050078 A1    10/2009
GB        2160252 A  * 12/1985 ............. F16G 15/12

OTHER PUBLICATIONS

EPO Machine Translation of DE 102009050078A1 (Year: 2019).*
International Search Report of Corresponding International Application No. PCT/DE2016/100359, filed Apr. 28, 2017.

* cited by examiner

Primary Examiner — Pradeep C Battula
(74) Attorney, Agent, or Firm — Head, Johnson, Kachigian & Wilkinson, PC

(57) ABSTRACT

The Invention relates to a coupling piece element for a Kenter shackle for anchor chains, which shackle comprises two half elements which can be coupled to one another and between which the coupling piece element can be inserted. The coupling piece element has a base body with at least one transverse borehole. Furthermore two securing bolts are provided, which are mounted in at least one transverse borehole in the base body and can be slidably moved outwards by means of at least one spreader element. The laterally protruding ends of the securing bolts are spherical or conical in shape. The base body has protrusions and/or recesses on its side surfaces facing the half elements for positive guidance on the half elements.

4 Claims, 4 Drawing Sheets

(58) Field of Classification Search
USPC .................................... 59/78, 84, 85, 86, 93
See application file for complete search history.

COUPLING PIECE ELEMENT FOR A JOINING SHACKLE FOR ANCHOR CHAINS

BACKGROUND OF THE INVENTION

The invention relates to a coupling piece element for a Kenter shackle for anchor chains.

A Kenter shackle, as known from U.S. Pat. No. 8,087,227 B2, for example, is a connector element consisting of at least two parts. It is used to subsequently connect two pieces of an anchor chain to each other and to be able to disconnect the connection again later, or to connect another part, in particular, the anchor itself, to an anchor chain. If the Kenter shackle is used as an anchor chain connector element, it must be symmetrical so that it runs through chain guides and fits into the chain sprocket of the anchor winch just like the individual links of the anchor chain.

At the end of the chain, however, a different type of Kenter shackle may be provided, consisting of two different halves, wherein one half is also rounded like an anchor shackle, for example, and the other half is V-shaped, in order to affect centering, for example, of an anchor chain link hooked into it.

Irrespective of the function and outer contour, the half elements of the Kenter shackle have the same form in the area of the connection. As half elements, two walking stick-like elements are provided, which can be pushed into each other laterally and feature toothing or interlocking receptacles. The shorter end of the walking stick- or J-shaped half element must end at the center plane so that the half elements can be pushed into each other laterally past each other. On the longer part of the half element, there are several teeth one above the other in parallel planes. In the side view, these have the shape of a sawtooth toothing. As soon as the half elements are connected, a so-called coupling piece element is inserted between them. It divides the oval formed by the half elements inserted into each other into an eight and also prevents the half elements pushed into each other laterally from drifting apart again. It also braces the half elements against each other when the Kenter shackle is under load, reducing deformation in the oval. The coupling piece is held and secured by a grooved pin which is driven into a borehole which runs diagonally through the entire unit consisting of the connected half elements and the coupling piece inserted between them.

The disadvantage of the usual securing of the coupling piece element is that the locking pin must be knocked in during assembly and additionally secured against falling out, for example with a lead plug that is pressed into the locking pin borehole. To open the Kenter shackle, the coupling piece element must be removed by knocking the locking pin out with a hammer. This can result in injuries, especially to the person who has to hold an ejector pin. A non-destructive removal of the coupling piece element at great depth under water, e.g. by a diving robot, is therefore not possible. It is possible to cut the coupling piece element into pieces by cutting and thus opening the shackle. However, the Kenter shackle is no longer easily reusable because a new coupling piece element has to be inserted and because the half elements have to be freed from the remains of the locking pin, which is only possible above water.

A chain link is shown in DE 6605034U. Two half elements can be pushed into each other laterally to form a chain link. To secure the half elements, a clamping element is used that contains two locking bolts in a cross borehole. These can be driven apart via a central clamping element and engage in the inner flanks of the half elements so that the clamping element is held in its position between the coupled half elements. However, the clamping element can be rotated around the axis formed by the locking bolts. The clamping element can also no longer be dismantled if the locking bolts become stuck in their borehole due to corrosion. It is not possible to exert a force on the locking bolts to return them from their locked position. The problem addressed by the present invention is, therefore, to provide a coupling piece element for a Kenter shackle that is easier to insert and remove between the half elements, and from which no residue remains in the half elements even in the event of destructive removal.

SUMMARY OF THE INVENTION

According to the invention, a coupling piece element is provided which has at least one locking bolt each on at least two opposite side faces pointing towards the inner flanks of the half elements. Both locking bolts can be completely countersunk into the base body and, when pushed out, only their end protrudes beyond the side surface, so that, in particular, the boreholes in the half elements can also be significantly reduced in length and no longer have to extend into the outer zones adjacent to the toothing receptacle, which have to absorb all tensile stresses. The points of weakness in the half elements, which are formed by the borehole in conventional fastening, are thus eliminated in this preferred embodiment of a coupling piece element.

The improved coupling piece provides two separate locking bolts in a common transverse borehole, which can be pushed outwards via a central spreader-element. In this way, the especially hemispherically rounded or conical ends of the locking pins protrude from the coupling piece and can engage in corresponding recesses on the inner flanks of the half chain elements. Lateral stop surfaces, which interact with corresponding protrusions or recesses on the inner flanks of the half chain elements, prevent the coupling piece from rotating around the locking pin axis. Disassembly is now much easier, including when using a diving robot. Only the hexagon socket screw on the coupling piece, which is preferably used as a spreader element, has to be loosened so that the two locking bolts can be pushed back in again. Due to the spherical or conical shape of the ends of the locking bolts, they are automatically pushed back when the coupling piece is pulled out of the Kenter shackle.

The coupling piece element according to the invention is intended in particular for use with anchor chains. As is well known, corrosion in salt water is a major problem, and even with the coupling piece of the present invention, it is taken into account that the advantageous development of the coupling piece element will in many, but not all, cases result in the easy release of the connection. In the case of advanced corrosion, only a destructive disassembly of the coupling piece element may be possible, whereby the coupling piece is cut in the middle, but the half chain elements remain undamaged.

This effect, which results directly from the application of the anchor chain, is also related to the protrusions and recesses. These serve to guide and form-fit the coupling piece element so that in the main load direction, the half elements of an associated Kenter shackle are additionally held together and twisting of the coupling piece element relative to the Kenter shackle is prevented. The Kenter shackle is to be supported between its inner flanks by the coupling piece element and the supporting surface is only reached in a certain position.

Therefore, twisting is prevented by the contact surfaces.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
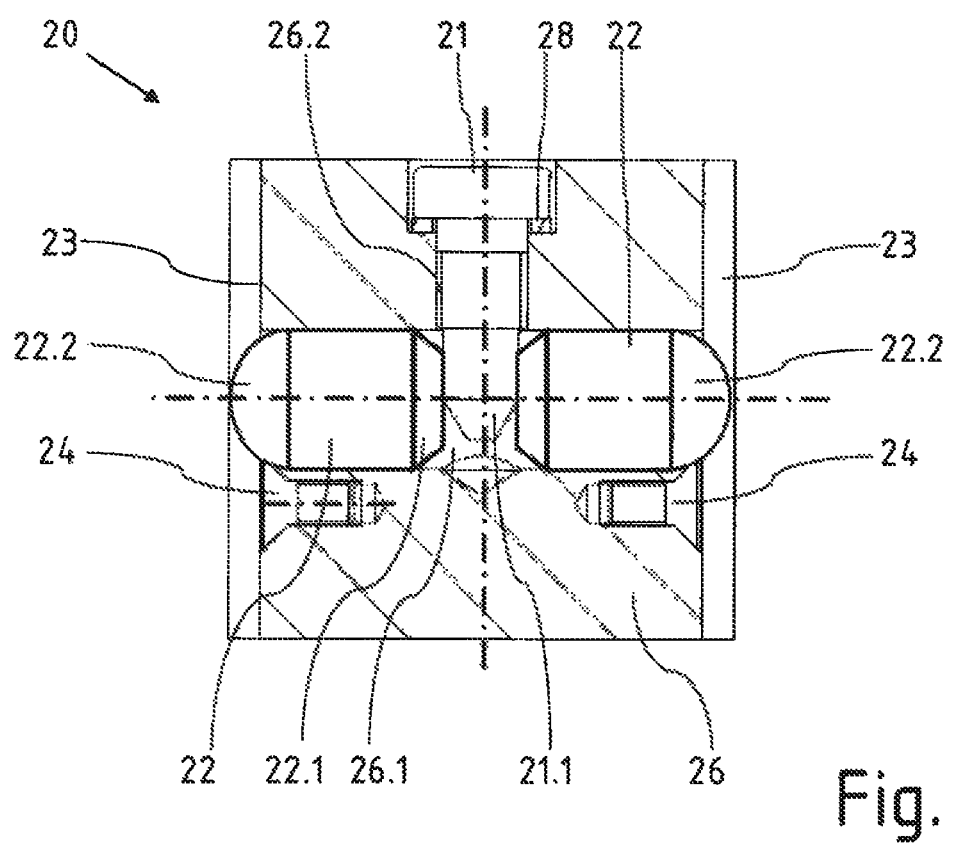
FIG. 1 is a coupling piece element in section.

The preferred embodiments of the present invention will now be described with reference to FIGS. 1-4 of the drawings. Identical elements in the various figures are designated with the same reference numerals.

FIG. 1 shows a cross-section through a preferred embodiment of a coupling piece element 20 according to the invention. It has in a base body 26 a transverse borehole 26.1, in which two locking pins 22 are slidably arranged. These are rounded hemispherically at their outward facing ends 22.2. They are secured against falling out by screws 24. The locking pins 22 have a conical section 22.1 on each of the inner surfaces facing each other. A threaded borehole 26.2 is formed perpendicular to the transverse borehole 26.1, in which a spreader element 21 with a threaded shoulder is accommodated. This is a screw-like element that has a screw head that is accommodated in a countersink. A spring washer 28 can also be placed under the screw head.

The screw head can contain a standard drive such as a hexagon socket.

The part of the spreader element 21 projecting into the transverse borehole 26.1 is initially smooth and cylindrical, with a truncated cone tip at its end. By screwing the expansion element 21 into the base body 26 of the coupling piece element 20, the tip 21.1 strikes the cone-shaped shoulders 22.1 of the locking bolts 22 and thus pushes them outwards. The rounded outer sides of the locking bolts 22 engage in boreholes formed on the inner flanks of the half elements of the Kenter shackle. This allows the coupling piece element 20 to be fixed between the two half elements. It blocks the half elements pushed into each other and keeps them at a distance under load so that no excess deformations and associated increases in tensile stresses occur in the half elements.

Figure 2:
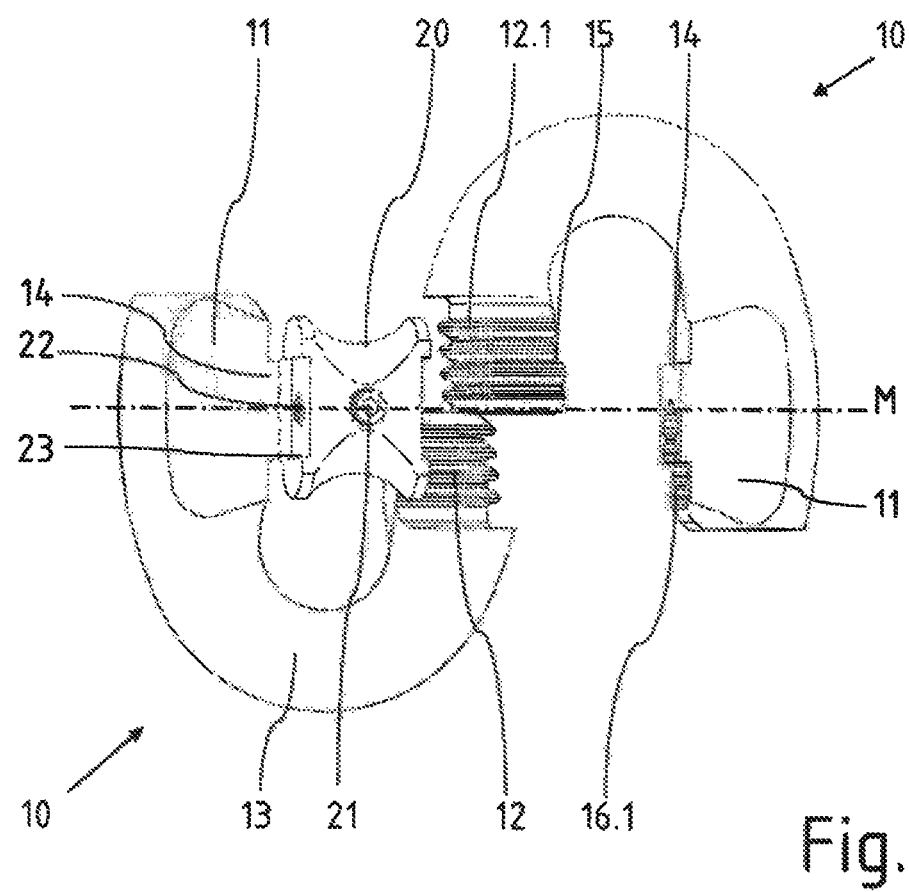
FIGS. 2 and 3 are individual parts of a Kenter shackle assembly, each in perspective view.

FIG. 2 shows two identical half elements 10 in the correct position for assembly. The half elements 10 must be positioned such that the end faces of the short legs 12 abut each other in the center plane. The half elements 10 are connected by sliding them in laterally so that the toothing engages on both sides. The area of the short leg 12 provided with external toothing 12.1 is pushed into the cavity 16 with the internal toothing 16.1 on a long leg 11. The mounting direction is therefore exactly transverse to the longitudinal axis or to the load direction.

To secure to each other the two half elements 10 pushed into each other and also to enable support of the two long legs 11 under load, the coupling piece element 20 is inserted between the legs 11, 12. It has recesses 23 on the side surfaces, which are intended for contact with corresponding protrusions 14, 15 on the half elements 10. The positive guide over the edges of the protrusions and recesses 14, 15, 23 prevents twisting of the coupling piece element 20. The coupling piece element 20 is secured in the Z direction by turning the spreader element 21 using a wrench so that the laterally emerging ends of the locking bolts 22 are pushed out to engage in recesses on the inner flanks of the inserted half elements 10.

With the insertion of the coupling piece element 20 between the half elements 10 a Kenter shackle 100 is fully assembled.

Figure 3:
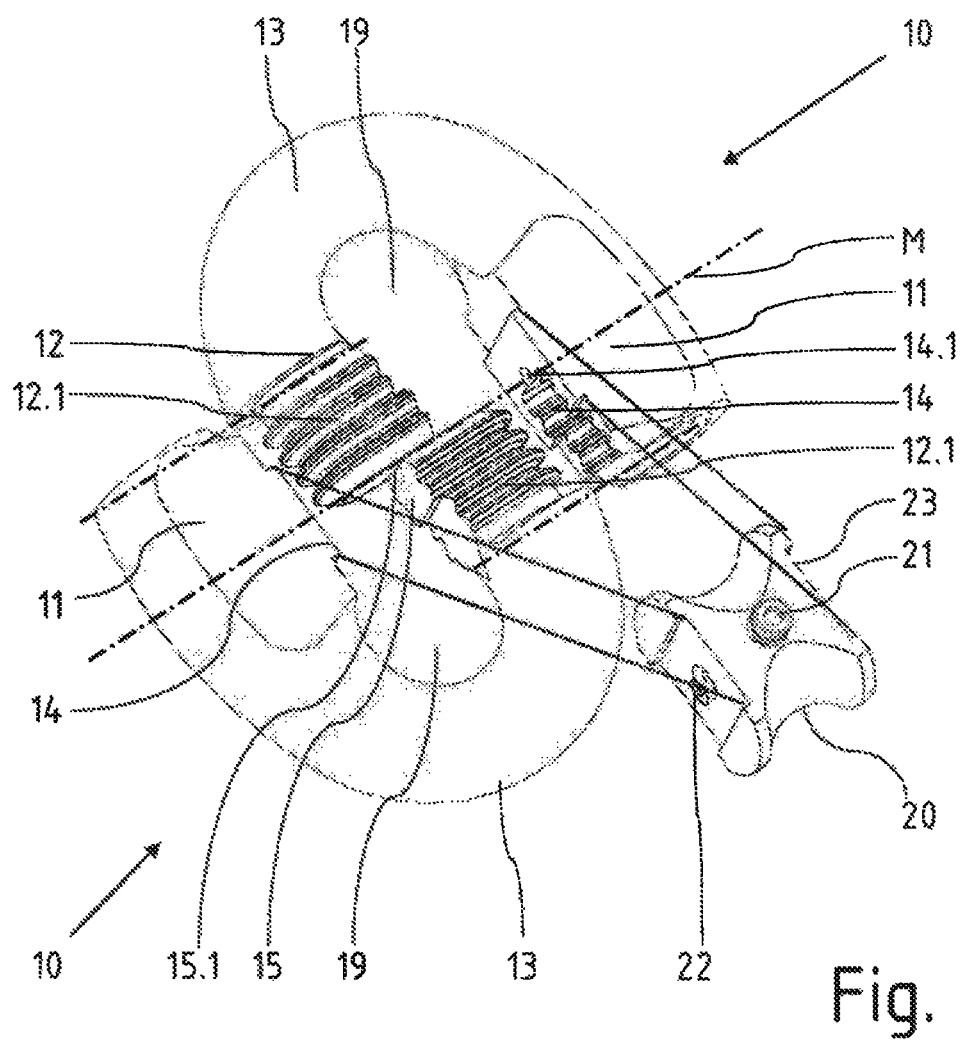

FIG. 3 shows the parts of the Kenter shackle 100 with the two half elements 10 and the coupling piece element 20 in a somewhat different perspective. It can still be seen here that the inward facing surfaces of the short leg 12 do not have any toothing, as no engagement is possible with a counterpart on the respective long leg 11. However, a protrusion 15 is formed on the inside of the short leg 12 to fill and complete the protrusion 14 accordingly after the half elements 10 have been pushed into each other.

The center axis of the locking bolts 22 is located exactly in the central plane M between the half elements 10, such that the receiving borehole for the locking bolts 22 is also divided into two. As can be seen in FIG. 3, one half 14.1 of the borehole is noticeable on the protrusion 14 on the inside of the long leg 11. Another half 15.1 of the borehole is formed on the protrusion 15 of the short leg 12. When the half elements 10 are pushed together, a closed borehole is created in which the locking bolts 22 or their rounded ends 22.2, respectively, can engage.

Figure 4:
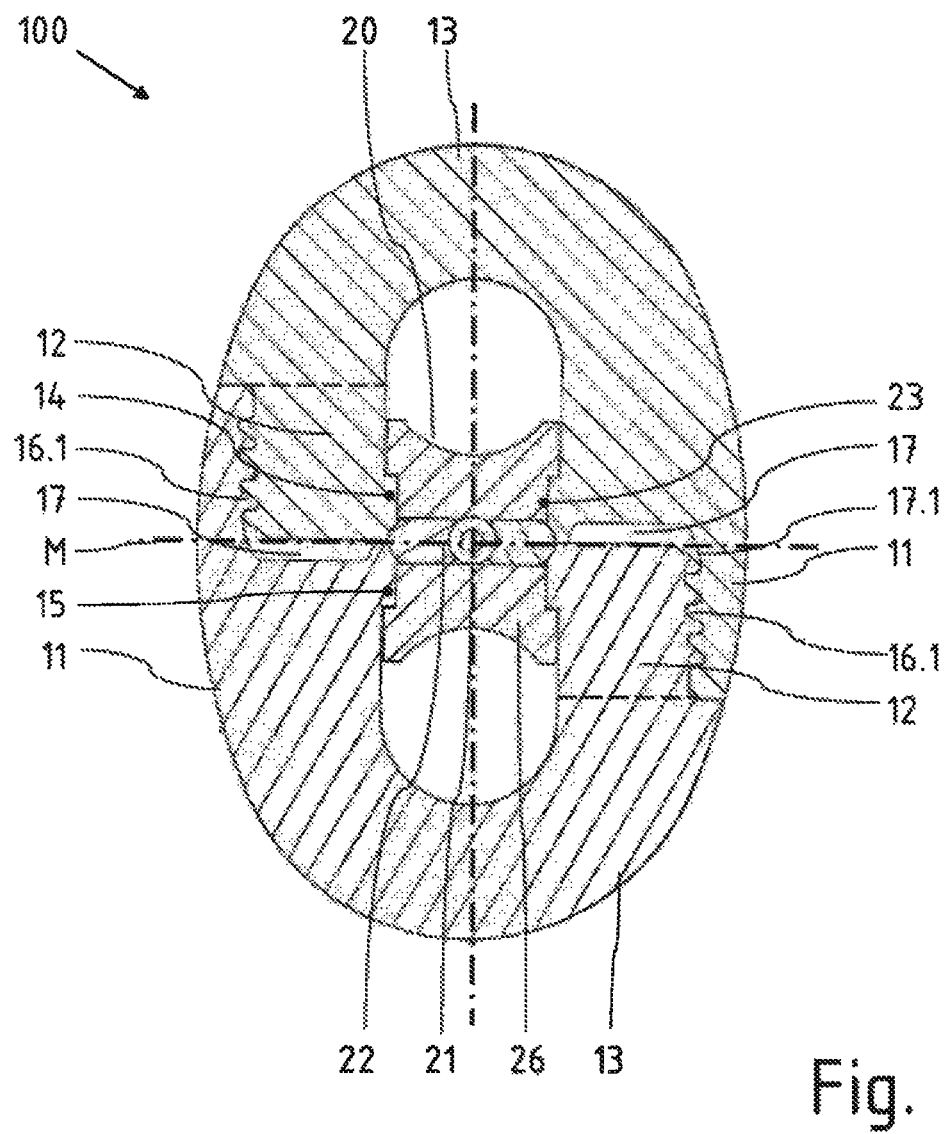
FIG. 4 is an assembled Kenter shackle in section.

FIG. 4 shows a fully assembled Kenter shackle 100 in a section. The toothing 12.1 on the short leg 12 outside and on the inside of the receiving space 16 interlock completely. Above the toothing 12.1 on the short leg 12, however, the receiving space 16 expands into a cavity 17, which remains empty even with the fully assembled Kenter shackle 100. It is essential that the hollow space 17 with a lateral flank 17.1 moves away from the last tooth tip 16.3 in the uppermost toothing plane roughly in the direction of the longitudinal axis of the Kenter shackle 100, i.e., parallel to the longitudinal axis or at an acute angle to it. With a further rounding, the lateral flank 17.1 of the cavity 17 merges into a roof area. With the Kenter shackle 100 under tension, the forces are transferred to the contact surfaces of the toothing, which are aligned transversely to the longitudinal axis. The arrangement of the cavity 17, which complements the actual receiving space 16 for receiving the toothing 12.1, the tensile stresses occurring under load to be diverted much better. This avoids stress concentration selectively at points. Rather, the stresses are redirected past the cavity 17 into the initial region of the respective long leg 11 and from there into the bent clasp 13.

The locking bolts 22 engage in the recesses on the half elements. A rotation of the coupling piece element 20 around the axis of the locking bolts 22 is prevented by the fact that the side edges of the recess 23 on the coupling piece element 20 rest against the side edges of the protrusions 14, 15 on the half elements 10.

There has thus been shown and described a novel coupling piece element for a joining shackle for anchor chains which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A coupling piece element for a kenter shackle for anchor chains, which shackle includes two half elements configured to be coupled to one another and between which a coupling piece element is configured to be inserted, wherein said coupling piece element comprises:
    a base body with a transverse borehole into which two locking bolts are configured to be inserted for engagement in recesses on inner flanks of the half elements of said kenter shackle; the two locking bolts, which are mounted in the transverse borehole in the base body, are movable outwards by a spreader element;
    said two locking bolts are arranged axially aligned in the transverse borehole running through the base body;
    the two locking bolts slidably movable outwards by means of the spreader element engaging between the locking bolts;
    the spreader element having a threaded shoulder accommodated in a threaded borehole in the base body;
    the base body has at least one of protrusions and recesses on its side surfaces which are configured to abut the half elements for positive guidance on inner flanks of the kenter shackle; and
    laterally protruding ends of the locking bolts are spherical or conical in shape.

2. The coupling piece element as in claim 1, wherein the spreader element has a tapered tip where the spreader element engages with the locking bolts.

3. The coupling piece element for a kenter shackle as in claim 1, wherein the transverse borehole is aligned perpendicularly to a longitudinal axis of the coupling piece element and configured to be aligned perpendicularly to the half elements of the kenter shackle.

4. The coupling piece element as set forth in claim 1, wherein a center axis of the locking bolts is configured to be located in a central plane (M) between the half elements and receiving recesses on the inner flanks of the half elements for the locking bolts are each divided into two halves.

* * * * *